United States Patent [19]

Ream, Jr.

[11] 3,837,224
[45] Sept. 24, 1974

[54] DIGITAL AUTOMATIC DEPTH CONTROL AND READOUT FOR A MOVABLE TRANSDUCER PACKAGE

[75] Inventor: Donald E. Ream, Jr., San Diego, Calif.

[73] Assignee: The United States of America as represented by the Secretary of the Navy, Washington, D.C.

[22] Filed: July 9, 1973

[21] Appl. No.: 377,485

[52] U.S. Cl. .......................... 73/170 A, 235/151.3
[51] Int. Cl. .......................................... G01b 7/26
[58] Field of Search ........ 73/170 A, 301; 324/78 D; 340/347 AD; 235/151.2, 151.3

[56] References Cited
UNITED STATES PATENTS

| 2,910,868 | 11/1959 | Fisher | 73/301 |
| 3,445,840 | 5/1969 | Carlstead | 340/347 AD |
| 3,553,728 | 1/1971 | Frank et al. | 324/78 D |
| 3,594,554 | 7/1971 | Pederson | 73/170 A UX |
| 3,731,196 | 5/1973 | Young | 324/78 D X |

Primary Examiner—Richard C. Queisser
Assistant Examiner—Stephen A. Kreitman
Attorney, Agent, or Firm—R. S. Sciascia; G. J. Rubens

[57] ABSTRACT

A system for remotely monitoring and maintaining a predetermined depth of an underwater instrumentation package. A signal proportional to depth is converted into pulses capable of being counted. The number of pulses counted within a given time period is a direct indication of the depth and is visually displayed on a digital readout device. An automatic control signal can also be generated by comparing the digital depth signal with a preset signal.

1 Claim, 4 Drawing Figures

DIGITAL AUTOMATIC DEPTH CONTROL AND READOUT FOR A MOVABLE TRANSDUCER PACKAGE

BACKGROUND OF THE INVENTION

The present invention relates to the remote control and positioning of an underwater transducer and more particularly to digital readout of the depth at which the transducer is positioned. In general, transducers of this type have usually been manually positioned in depth by an operator who estimates the depth of the transducer package by counting markings on a line attached to the test package which is pulled down as the package discends. The transducer package was maintained at the appropriate depth as the water level changed due to the variations by manually readjusting the depth of the transducer. This provided for a rather inaccurate system for positioning the transducer package which in turn made it difficult to obtain accurate testing of equipment mounted on board ship or aircrafts for which this transducer package was used.

SUMMARY OF THE INVENTION

The present invention provides for an automatic depth control and readout system for an underwater transducer device. A sensor for measuring the depth of the transducer provides a DC voltage proportional to the depth of the transducer. The DC voltage is converted into pulses capable of being counted. A reference clock is provided to periodically gate a predetermined number of the pulses. The gated pulses are counted in a counter and fed to a count storage device where the count is stored until it is updated during the next counting sequence. The output of the count storage device is fed to a three digit depth readout. The output of the count storage device is also fed to a comparator circuit for comparing its input with a preset depth input to provide for automatic depth control.

Accordingly, an object of the invention is the provision of an improved automatic depth control and readout system for an underwater transducer package.

Another object of the invention is the provision of an automatic depth control and readout system which provides for the digital control of the positioning and for the digital readout of the depth of an underwater transducer test package.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
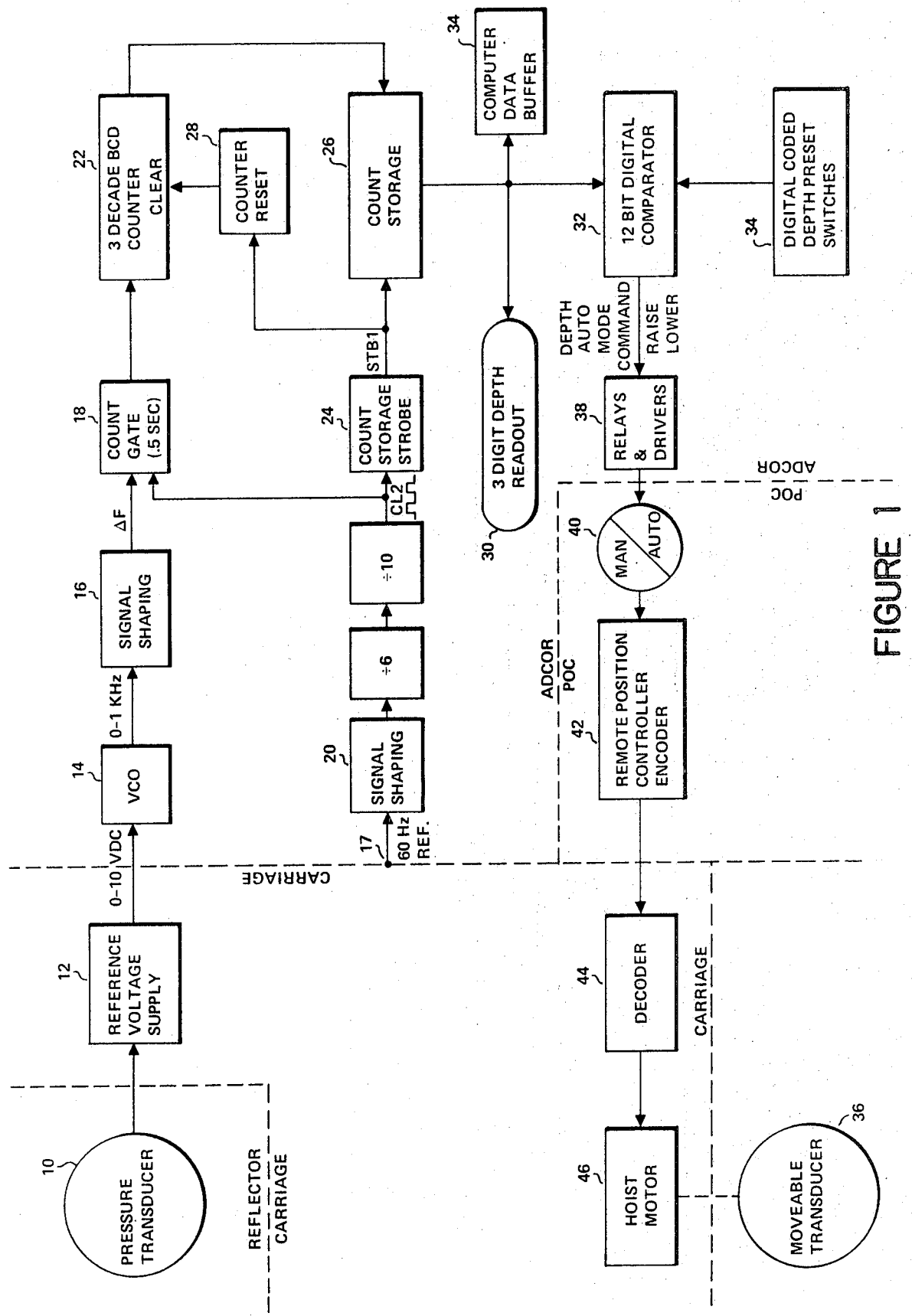
FIG. 1 is a block diagram of the preferred embodiment of the invention.

Referring now to the drawings wherein there is shown in FIG. 1 a pressure transducer 10 which may be of the variable resistance type and provides a change in resistance according to the depth of the water (pressure) to change the output voltage of a reference voltage supply 12. The voltage proportional to depth or pressure drives a voltage controlled oscillator 14. The frequency output signal from voltage control oscillator 14 is shaped in a signal shaping circuit 16 which may be a Schmitt trigger to make the signal compatible with TTL logic level requirements. The shaped signal is then fed as an input to counter gate 18. Counter gate 18 is controlled by a 1 Hz symmetrical square wave clock pulse supplied from a 60 cycle source at terminal 17. The 60 cycle source from terminal 17 is shaped in a signal shaping circuit 20 which may also be a Schmitt trigger and then fed to a frequency dividing circuit 13 for dividing the signal by six. The divided by six signal is fed to a divided by 10 circuit 15 to provide a clock pulse with a period of 1 second. Since the clock pulses are symmetrical they are, by way of example, "high" (3.5 volts DC) for one-half cycle (0.5 sec.) and "low" (0 VDC) for the other half cycle (0.5 sec). Counter gate 18 is open during the 0.5 sec "high" half of a cycle and allows the output of the voltage control oscillator 14 to be counted in the three decade, binary coded decimal counter 22.

The maximum count that can accumulate in counter 22 during the 0.5 sec count is 500, half of the 1 KHz output of oscillator 14 corresponding to a maximum depth of 50 Ft. The counter display would then be a direct readout of the test transducer package depth to one tenth of 1 foot.

On the "high" half of the clock pulse, counter gate 18 is closed and a ten $\mu$sec, negative going strobe pulse is generated by a strobe pulse generator 24. The strobe pulse controls two functions. First the strobe pulse is fed to count storage register 26 for gating the storage register so that the output of counter 22 can be stored and updated. Secondly, upon its return to the "high" level it triggers a monostable multivibrator 28 which generates a 10 $\mu$sec wide, positive going reset pulse that resets binary coded decimal counter 22 to 0.

The binary coded decimal depth information stored in storage register 26 is fed to readout drivers for visual display device 30, to one input of a 12-bit, digital comparator 32 and to computer data buffer 34 for use in making calculations and graphical calibration plots. The information stored in the storage register 26 is held there until it is updated during the next counting sequence. Since storage register 26 is updated on every negative-going transistion of the clock pulses, the count is stored for 1 second. This accounts for the systems fixed, one second display time. The visual readout on readout device 30 is continuous with no display tube jitter.

The depth reading and storage register 26 is compared in comparator 32 with a preset depth number that can be set into switch 34. This preset number is the depth at which it is desired to maintain the test package or movable transducer 36. Comparator 32 provides only relative magnitude information and not a true arithmetic difference, i.e., it senses which number is greater.

The output from comparator 32 activates a relay which selects via a manual automatic control switch 40 the appropriate control signal from remote position controller and coder 42. The selected control signal will be decoded in decoder 44 and fed to hoist motor 46.

This causes the test package 36 to move in the direction required to make the true depth reading from counter 22 approach and equal to the preset depth.

Upon coincidence, the control signal is removed by the appropriate relay switches. The test package 36 comes to a stop and will remain until water level changes cause the test package to move in the required direction to maintain the preset depth The normal sequence of operating events would be to place the manual/auto switch 40 in the manual mode and lower the test package 36 via the position controller unit 42 while observing the changing depth readout on readout 30. When the required depth is reached, the depth preset switch 34 would be set to this depth reading and the manual/auto switch 40 would be placed in the auto mode. If the water level now changes due to tidal change or large period surface wave action, the unit will automatically move test package 36 in the required direction to maintain preset depth. If the required depth is known in advance and the test package is not at this depth, the required depth can be set into the preset switches 34 and switch 40 placed in the auto mode. The package will now move automatically from its present position to the preset depth and stop without the need of further operator attendance.

Figure 2A:
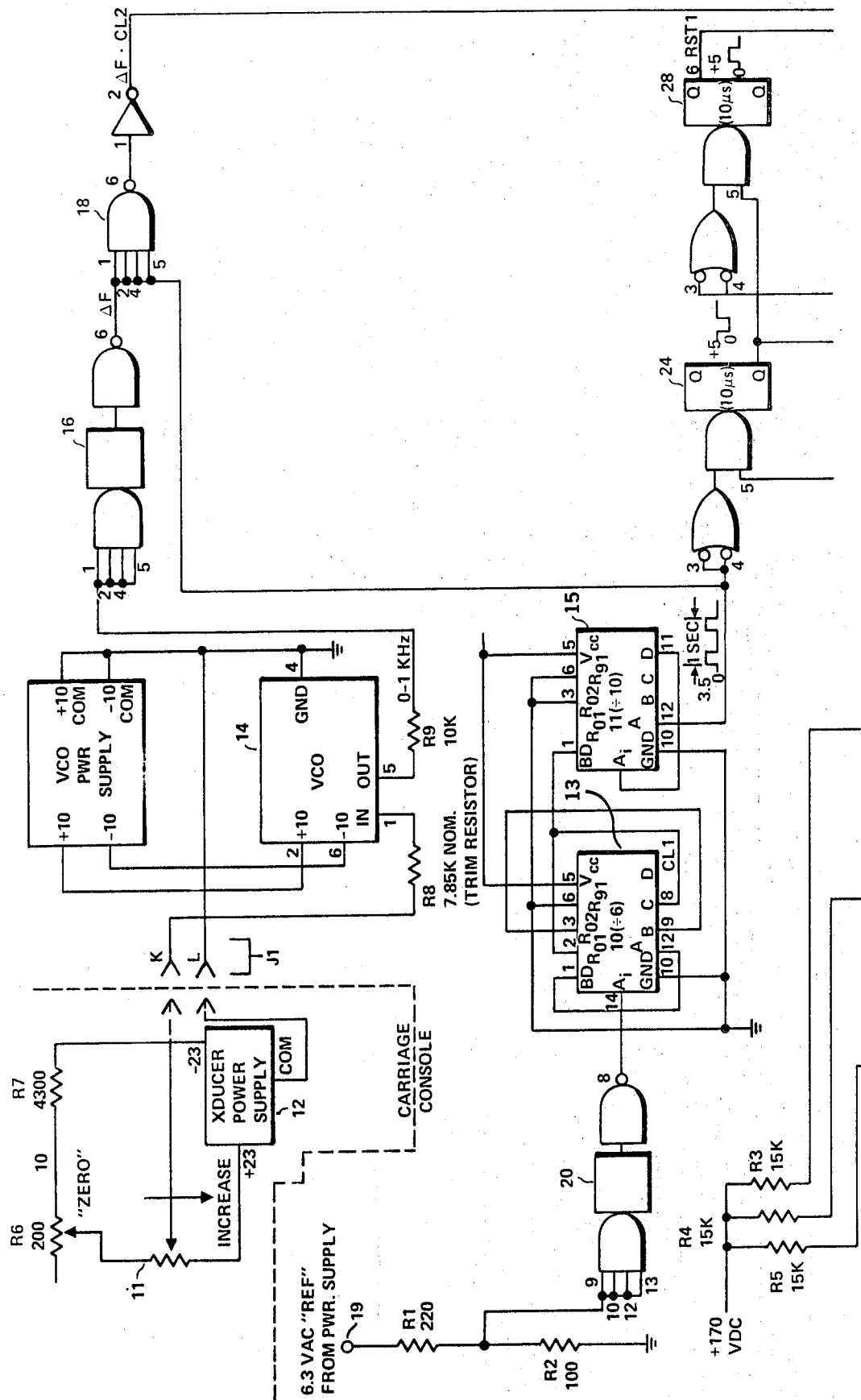
FIGS. 2A, 2B and 2C are a logic diagram of the preferred embodiment of FIG. 1.

Referring now to FIG. 2A which shows the system in more detail, pressure transducer 10 includes a resistor 11 which has its resistance varied according to the water depth (pressure). A power supply 13 is connected across resistor 11 to provide a variable voltage output which is fed to voltage control oscillator 14. By way of example, the resistance of resistor 11 may vary from 250 ohms at the water surface, to 2,130 ohms at a depth of 50 ft. The pressure transducer is attached to the test package and its output is routed to an above water, carriage-mounted junction box in the usual manner.

The frequency output range of oscillator 14 should be linear and by way of example, for an input voltage of 0 to 10 volts DC would provide a frequency range of 0 to 1 KHz. This frequency output is shaped in the Schmitt trigger signal shaping circuit 16 and is then fed to the input of counter gate 18. Counter gate 18 is controlled by symmetrical square wave clock pulse with a period of 1 second. The clock pulse is derived from a 60 cycle source at terminal 19 which is fed through a signal shaping circuit 20 which may also be a Schmitt trigger and is fed to two frequency dividing circuits 13 and 15. The positive going clock pulse gates counter gate 18 and allows the output signal from voltage control oscillator 14 to be counted in the three decade binary coded decimal counter 22 consisting of integrated circuits 21, 23, and 25.

Figure 2B:
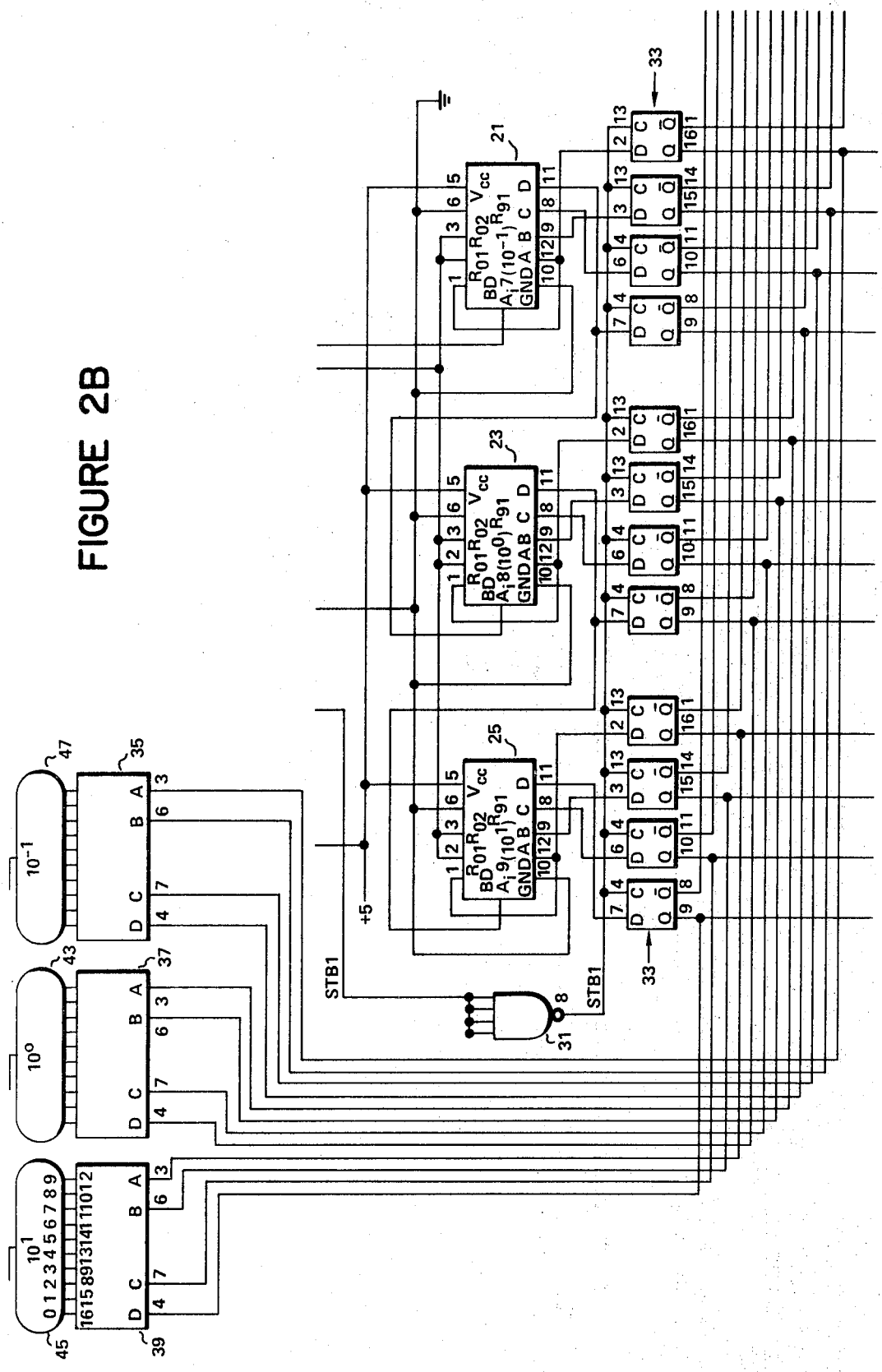
Figure 2C:
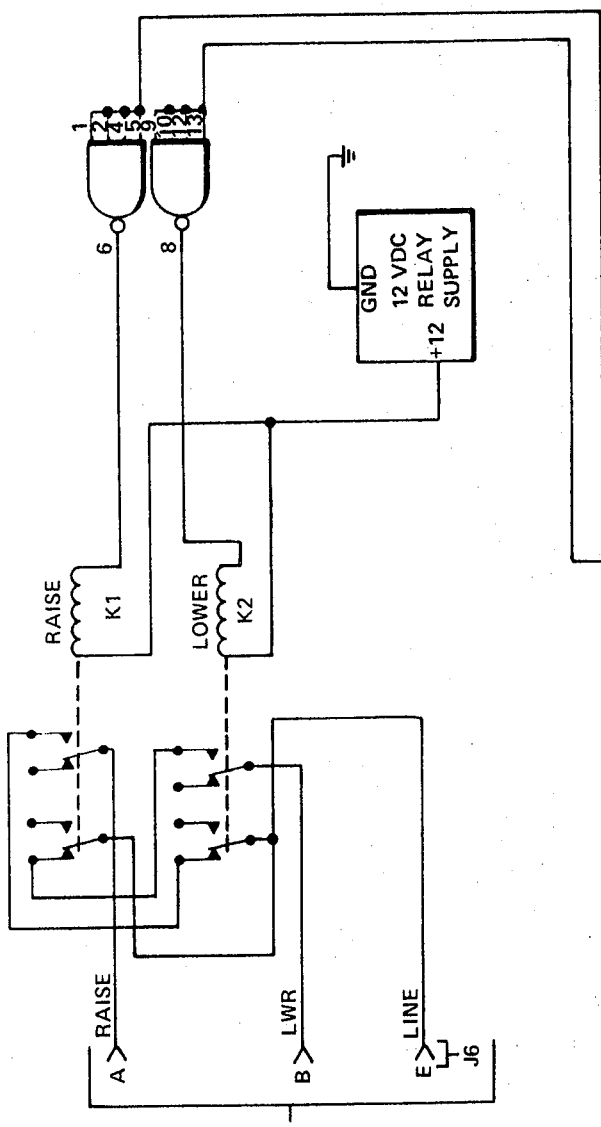
Figure 2C:
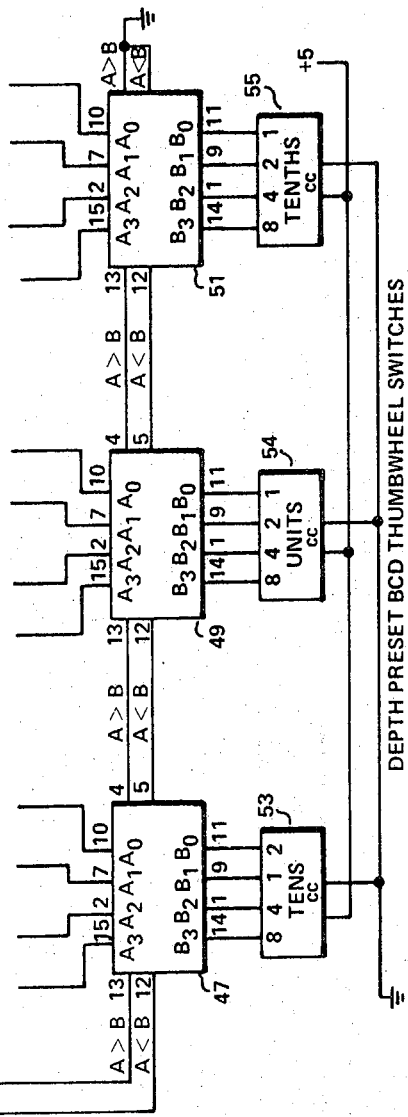

On the negative-going half of the clock pulse counter gate 18 is closed and a 10 nanosecond negative-going strobe pulse is generated by monostable multivibrator 27 (FIG. 2A). The strobe pulse is fed to storage register 26 via gate 31 (FIG. 2B) which consists of 12 bystable latches 33 so that the outputs from counter 26 can be stored and updated. The strobe pulse is also fed to and triggers another monostable multivibrator 28 which generates a ten nanosecond wide, positive going reset pulse that resets counters 21, 23, and 25 (FIG. 2B).

The stored information in bystable latches 33 is fed to drivers 35, 37, and 39 for driving visual display tubes 41, 43, and 45. The stored information of bystable latches 33 is also fed to a 12 digital comparator 32 which consists of integrated circuits 47, 49, and 51. The other inputs to comparators 32 is the output from the preset switches 53, 54, and 55. The output of comparator 32 provides only relative magnitude information and not the true arithmetic difference. It senses whether the number input from bystable latches 33 is greater than the preset inputs and inactivates either relay K1 or K2. The normal sequence of operating events are then as described above.

Obviously many modifications and variations of the present invention are possible in the light of the above teachings. It is therefore to be understood that within the scope of the appended claims the invention may be practiced otherwise than as specifically described.

What is claimed is:

1. In a digital automatic depth control and readout system for a movable transducer package the combination comprising:

a. a movable transducer package to be positioned and maintained at a predetermined depth in water, b. sensing means attached to said movable transducer for generating an output voltage proportional to the depth of said movable transducer, c. a voltage controlled oscillator coupled to said transducer and being responsive to the output voltage to convert said transducer output voltage into a pulse signal capable of being counted, d. a source of clock pulses, e. a count gate having a first input coupled to the output of said voltage controlled oscillator and a second input coupled to said clock pulse source, said count gate being responsive to the positive duration of the clock pulse for gating said converted signal, f. counting means coupled to said count gate for counting said gated signal, g. strobe pulse generating means coupled to said clock pulses and being responsive to the positive half of said clock pulse to generate a negative going pulse, h. count storage means coupled to said counting means and to said strobe pulse generating means for storing the count when gated by and for the duration of said negative going pulse from said strobe pulse generating means, i. counter reset means coupled to said strobe pulse generating means and to said counting means for generating a positive going reset pulse in response to the termination of the negative going pulse from said strobe pulse generating means, j. digital readout means coupled to said count storage means for providing a visual readout of the stored count.

* * * * *